March 13, 1962 — A. H. KURTZ — 3,024,793
EGG WASHING APPARATUS
Filed April 16, 1959
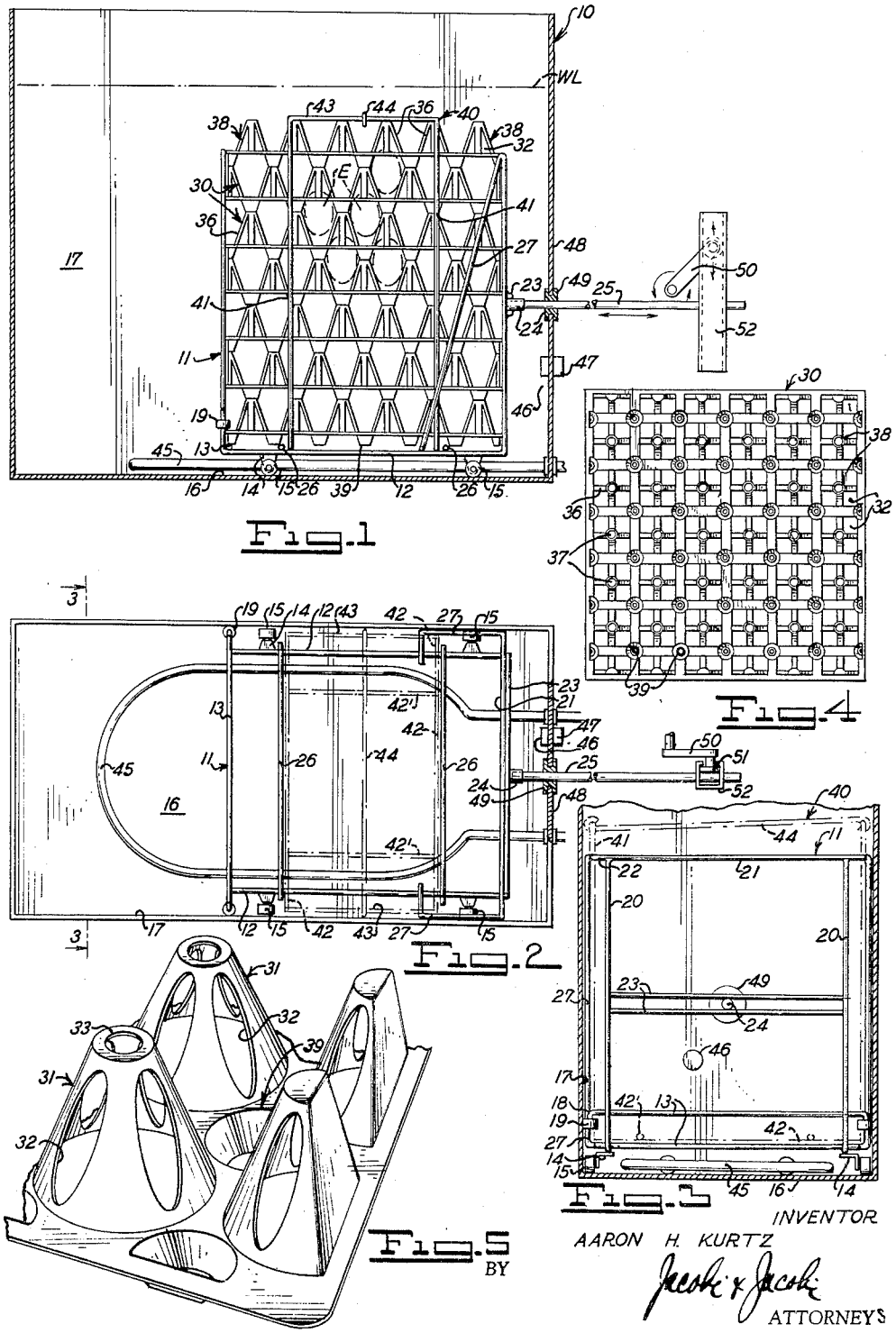
INVENTOR
AARON H. KURTZ
BY
Jacobi & Jacobi
ATTORNEYS

3,024,793
EGG WASHING APPARATUS
Aaron H. Kurtz, R.D. 1, New Holland, Pa.
Filed Apr. 16, 1959, Ser. No. 806,945
6 Claims. (Cl. 134—56)

This invention relates to an egg washing apparatus, and has as its primary object the provision of an improved apparatus for thoroughly washing and cleansing a large number of eggs simultaneously.

An additional object of the invention is the provision of such an apparatus which incorporates a tank adapted to be filled with a given amount of cleaning solution, heated and held at a given temperature, a holder for the retention of a large quantity of eggs which may be moved as a unit, and means for reciprocating the egg holder in the tank to insure the thorough washing of all sides of each egg.

An additional object of the invention is the provision of such a device wherein the reciprocation of the egg holder creates a turbulent current of water wherein the surges of the water counter the reciprocatory movement of the holder to insure thorough contacting of all exterior parts of each individual egg.

An additional object of the invention is the provision of an egg holder wherein the eggs are held in a series of horizontal trays which are so designed as to partially surround and loosely hold each egg to permit limited rotative movement of each egg during reciprocation of the holder, and wherein the holding elements are perforated to admit surges of water to all portions of the egg.

Still other objects reside in the combinations of elements, arrangements of parts and features of construction, all as will be more fully pointed out hereinafter and disclosed in the accompanying drawings wherein there is shown a preferred embodiment of this inventive concept.

In the drawing:

FIGURE 1 is a side view partially in elevation and partially in section of one form of apparatus embodying the features of the instant invention.

FIG. 2 is a top plan view of the apparatus of FIG. 1, with the egg supporting trays omitted.

FIG. 3 is a sectional view taken substantially along the line 3—3 of FIG. 2 as viewed in the direction indicated by the arrows.

FIG. 4 is a top plan view of one of the egg containing trays or dividers shown in FIG. 1, and FIG. 5 is an enlarged fragmentary perspective view of a corner of the tray or divider as shown in FIG. 4.

Similar reference characters refer to similar parts throughout the several views of the drawing.

Having reference now to the drawing in detail, there is generally indicated at 10 a tank which is preferably rectangular in configuration, and which contains a reciprocating egg holder or carrier generally indicated at 11. The carrier 11 basically comprises a wire framework, which includes side wires 12 and end wires 13 comprising a rectangular base. The lower side wires 12 are provided at spaced intervals with oppositely disposed L-shaped brackets 14, each of which carries a wheel or roller 15 which is adapted to move along the bottom 16 of tank 10 at a point closely adjacent the side walls 17 thereof. Each of the lower end wires 13 is double, as best shown in FIG. 3, and connected by an end piece 18, which carries a buffer 19 adapted closely to engage each side wall 17. Uprights 20 extend from the ends of each wire 12 to upper end crosswires 21 and side wires 22. Across one end of the carrier 11 are a pair of intermediately positioned cross wires 23, which contain between them means for supporting a boss or bushing 24 to which is secured a longitudinally extending operating rod 25. The bottom of carrier 11 is further provided with transversely extending wires 26 and the side uprights 27, the latter being angularly disposed as best shown in FIG. 1, so that the carrier serves as a frame for a plurality of egg supporting trays or dividers 30. Each tray or divider 30 is comprised of a plurality of spaced conical protuberances 31, each of which is provided with side perforations 32 and top perforation 33. The perforations may be oval as disclosed in FIG. 5, or may take the form of apertures separated by dividing strips 36 forming pyramidal structures 38 having top apertures 37 as shown in FIG. 4. Centrally located between each of the pyramids or cones 38 or 31, there is provided a depressed portion 39 into which is adapted to be positioned the end of an egg E as indicated in dotted lines. A plurality of trays 30 are adapted to be superposed one on top of the other as indicated in FIG. 1, and retained in superposed relation as by means of a carrier frame generally indicated at 40, which includes vertical wire members 41 and base members 42 adapted to extend beneath the lowermost tray, the upper ends of the wires 41 being connected by longitudinally extending wires 43 which are in turn connected by a transversely extending top piece 44 which extends over the uppermost tray for securing the plurality of trays in a closely assembled unit. The frame 40 may thus be moved as a unit together with its egg trays 30 and their contents, and readily positioned in or removed from the carrier 11 as desired.

The tank 10 is adapted to be filled with water to a depth sufficient to cover the uppermost tray 30 as indicated by the dotted line in FIG. 1, the tank being of a depth so that there is a material amount of water above the uppermost tray.

The tank may be of any desired size, and one or more carriers adapted to carry any desired size and number of trays may be positioned therein.

A heating element 45 is suitably positioned in the bottom of the tank in such position as not to interfere with the reciprocatory movement of the carrier 11, and is suitably controlled by an internally positioned thermostatic element 46 having an external control 47 of conventional design.

The rod 25 is adapted to extend through an end wall 48 of the tank 10 through a suitable fluid-tight bushing 49, and is adapted to be reciprocated in any desired conventional manner as by means of a rotating crank arm 50 having an extremity 51 engageable in a channel member 52 fixedly secured to the rod 25.

The crank 50 is adapted to be operated by a suitable electric motor or the like (not shown), which may in turn be controlled by a suitable conventional control element. The speed of reciprocation will control the degree of turbulence.

Obviously other suitable conventional means for reciprocating the frame may be employed if desired.

In the use and operation of the device, eggs to be cleaned are adapted to be positioned in each of the trays 30 with their rounded or pointed ends in the depressed portions 39 and their sides lightly contacting the pyramidal or conical members 31 or 38 so as to be loosely retained in upright position. After a tray is filled, it is adapted to be seated within the wire carrier 40 and an additional tray superposed thereon. The trays are preferably constructed of relatively soft plastic to provide a yielding cushion for the eggs, and may be of any desired size to accommodate any desired number of eggs. When a sufficient number of trays has been filled up to the capacity of the container 40, the crosspiece 44 is positioned over the topmost tray and secured so that the entire assembly may be moved as a unit.

This unit is then positioned in the carrier 11 in the tank 10, in which the water or cleaning fluid has preferably been preheated to a desired temperature. Actuation of the motor will now cause reciprocation of the rod 25 at a predetermined speed, which will in turn cause reciprocatory movements of the carrier 11 on its wheels 15 back and forth in the tank 10. Due to the fact that the sides of the carrier closely engage the side walls 17 of the tank, displacement of water within the tank must occur over and under and through the carrier which will result in a surge of the water in a direction opposite to that of the movement of the carrier. Simultaneously, turbulence occasioned by the passage of water about the individual eggs will cause agitation of the eggs in such manner that all portions of their surface will be exposed to the action of the cleansing fluid. The operation of the device may be continued as long as may be necessary and at a suitable desired speed to thoroughly cleanse the eggs, whereupon a carrier unit 40 may be removed and a similar unit substituted therefor.

From the foregoing it will now be seen that there is herein provided an apparatus which accomplishes all of the objects of this invention and others, including many advantages of great practical utility and commercial importance, plus labor saving benefits.

As many embodiments may be made of this inventive concept and as many modifications may be made in the embodiment hereinbefore shown and described, it is to be understood that all matter herein is to be interpreted merely as illustrative and not in a limiting sense.

I claim:

1. In an apparatus for washing eggs, the combination of a tank adapted to contain a cleaning solution, said tank being provided with a heating element and thermostatic means for controlling said heating element; a carrier in said tank comprising a wire frame including uprights closely adjacent the side walls of said tank, resilient buffers on said uprights, and rollers carried by the base of said frame for linear movement along the bottom of said tank; a plurality of egg trays in related assembly to form a unit, said unit seating in said carrier, each of said trays being made of relatively soft flexible material and comprising a base, a plurality of perforate pyramidal projections forming spacers extending upwardly from said base, and a plurality of depressions between said projections extending downwardly from said base into which the ends of eggs are adapted to be positioned; and means for reciprocating said carrier.

2. The structure of claim 1 wherein the means for holding said trays in related assembly comprises a second wire frame adapted to be positioned in said carrier for reciprocation therewith.

3. In an apparatus for washing eggs the combination of a tank adapted to contain a cleaning solution and having a heating loop extending across the major portion of the base thereof, a carrier reciprocally mounted in said tank, said carrier having wheel means for supporting said carrier above said loop with said wheel means disposed on opposite sides of said loop, said carrier having buffers disposed on opposite sides of said carrier for engaging the side walls of said tank to maintain said carrier centrally disposed within said tank during reciprocation thereof, a plurality of egg trays having apertures covering at least the major portion of the egg supporting surface thereof, means for securing said egg trays in related assembly to form a unit supporting eggs in positively spaced apart positions, said unit removably seating in said carrier for reciprocation therewith, means for reciprocating said carrier, and means for controlling the heat generated by said loop.

4. In an apparatus for washing eggs, the combination of a tank adapted to contain a cleaning solution, a carrier reciprocally mounted in said tank, said carrier having wheel means depending from the base thereof for engaging the bottom wall of said tank, said carrier having buffer means projecting from opposite sides thereof for engaging the side walls of said tank to maintain said carrier centrally disposed within said tank during reciprocation thereof, a plurality of egg trays having apertures therein and adapted to support said eggs in positively spaced apart positions, means for securing said egg trays in related assembly to form an egg supporting unit, said unit removably seating in said carrier for reciprocation therewith, and means for reciprocating said carrier.

5. In an apparatus for washing eggs, the combination defined in claim 4 wherein said means for reciprocating said carrier comprises a rod member coupled to said carrier centrally of one end thereof and extending through and beyond the wall of said tank opposite said end, and means for imparting reciprocatory movement to said rod.

6. In an apparatus for washing eggs, the combination defined in claim 5 wherein said carrier and said means for securing said egg trays in related assembly comprise wire frames.

References Cited in the file of this patent
UNITED STATES PATENTS

| | | |
|---|---|---|
| 892,104 | Whelan | June 30, 1908 |
| 948,046 | Frankem | Feb. 1, 1910 |
| 1,227,224 | Voorhorst | May 22, 1917 |
| 1,573,977 | Lee | Feb. 23, 1926 |
| 2,346,161 | Grant | Apr. 11, 1944 |
| 2,580,800 | Lavendar | Jan. 1, 1952 |
| 2,619,099 | Young | Nov. 25, 1952 |
| 2,682,213 | Shapiro | June 29, 1954 |
| 2,891,561 | Hagans | June 23, 1959 |
| 2,950,726 | Kuhl | Aug. 30, 1960 |